United States Patent Office 3,729,363
Patented Apr. 24, 1973

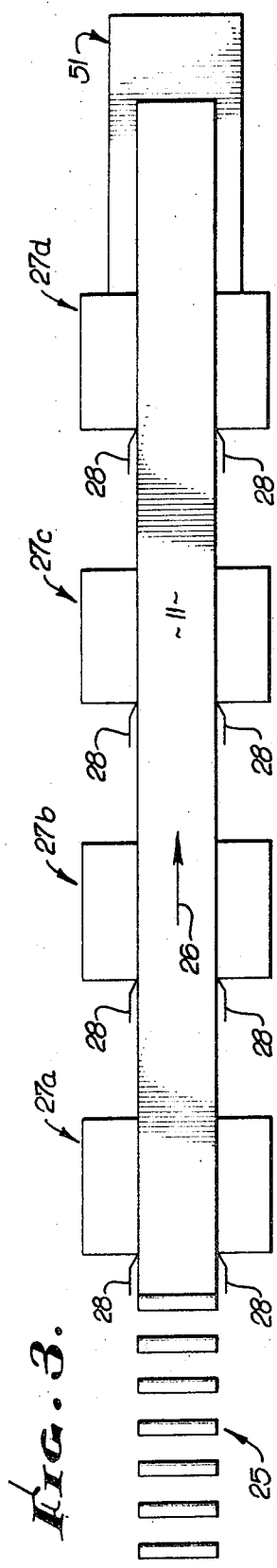
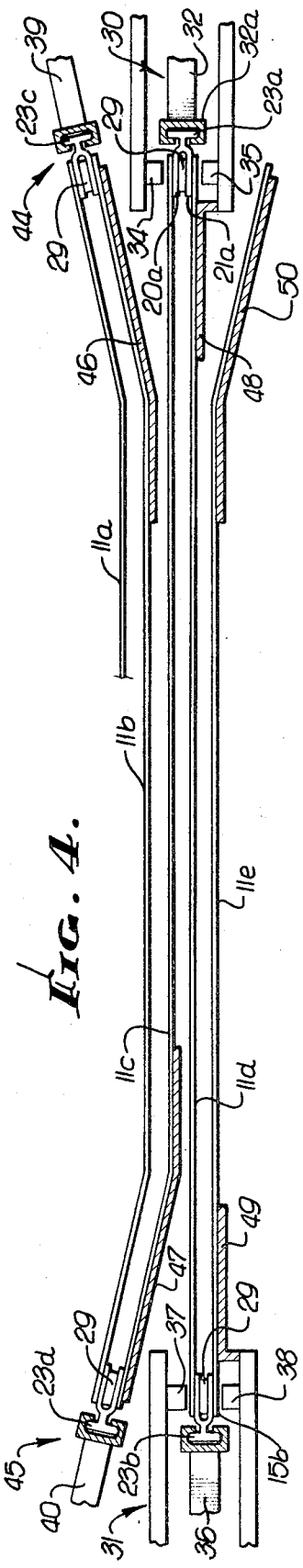
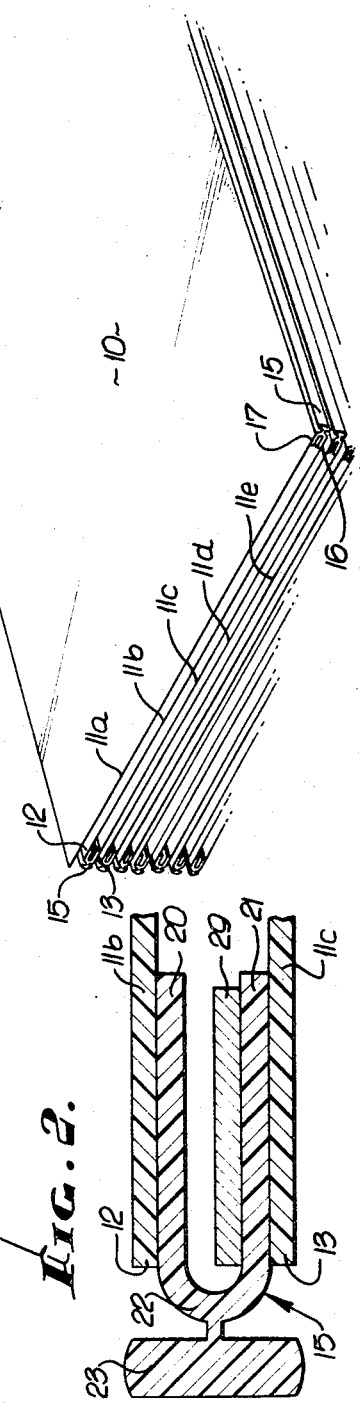
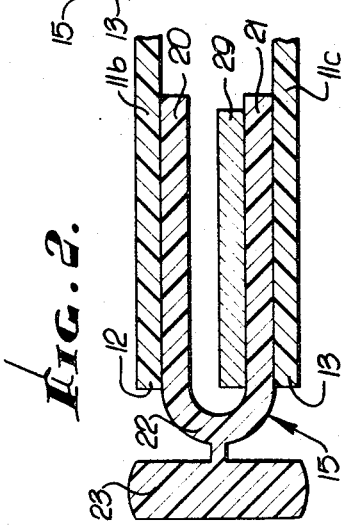

3,729,363
APPARATUS FOR EDGE JOINING PANELS
Carlos A. Mollura, 2824 Del Oro Lane,
Fullerton, Calif. 92632
Filed Mar. 5, 1971, Ser. No. 121,408
Int. Cl. B32b 31/10
U.S. Cl. 156—559  5 Claims

ABSTRACT OF THE DISCLOSURE

A plurality of plastic film panels are stacked and joined edge-to-edge to form a wide, zigzag-folded sheet. Each joint incorporates an extruded plastic joining member of U-shaped cross-section having leg portions welded respectively to the panel edges being joined. Projecting from the closed end of the joining member is a guide bead adapted to direct the panels through an automated production facility in which sets of panels are welded together at successive stations to form the folded sheet.

BACKGROUND OF THE INVENTION

(1) Field of the invention

The present invention relates to a folded plastic sheet which may be opened to provide a continuous surface of substantial width, and to a method of edge joining stacked, plastic film panels to form the sheet.

(2) Description of the prior art

Often it is desirable to cover a very large surface area with a continuous plastic sheet. For example, such sheets may be used to line the bed of an artificial lake, or to cover large accumulations of waste or sewage. For such applications, continuous sheets of say 100 feet by 100 feet or more may be required.

Practical considerations limit the width in which plastic sheet material can be manufactured to less than about 10 feet, although such material may be supplied in rolls of several hundred feet or more in length. While such individual sheets could be laid out side by side to cover a wide surface, it would be exceedingly difficult subsequently to join the adjacent edges of the sheets to provide an unbroken plastic surface.

Some attempt has been made in the past to produce a wide sheet from a plurality of narrower ones. For example, the U.S. Pat. No. 3,065,121 to Andrews discloses a technique in which individual plastic sheets are superposed, and the marginal edge of one sheet overfolded and solvent welded to the adjacent sheet. This technique produces a composite sheet of the desired width, but requires complicated equipment to accomplish the overfolding and solvent welding.

The present invention provides a technique for edge joining superposed plastic film panels to form a wide sheet, and employs simple automated equipment to form a unique edge-to-edge joint which will not separate when the folded sheet is opened to full width.

SUMMARY OF THE INVENTION

In accordance with the present invention there is provided a wide, zigzag-folded sheet comprising a plurality of stacked plastic film panels joined edge-to-edge by means of extruded plastic joining members. These joining members serve the double function of providing a welded connection between the marginal edges of adjacent panels, and of providing means for guiding the panels through an automated production facility.

In a preferred embodiment, the extruded joining member is of U-shaped cross-section, having leg portions welded respectively to the panel edges being joined. Projecting outwardly from the closed end of the joining member is a guide bead which engages cooperating rails in the production equipment so as to direct the member past successive welding stations at which different pairs of panels are joined.

Thus an object of the present invention is to provide a wide, folded plastic sheet having a unique panel-connecting joint structure, and also to provide a method for automated fabrication of such a sheet.

BRIEF DESCRIPTION OF THE DRAWINGS

Detailed description of the invention will be made with reference to the accompanying drawings wherein like numerals designate like parts in the several figures. These drawings, unless described as diagrammatic or unless otherwise indicated, are to scale.

FIG. 1 is a perspective view of a wide, zigzag-folded plastic sheet in accordance with the present invention.

FIG. 2 is an enlarged, transverse sectional view showing the edge-to-edge joint structure utilized in the folded sheet of FIG. 1.

FIG. 3 is a diagrammatic view of an assembly line for fabricating the folded sheet of FIG. 1.

FIG. 4 is a simplified transverse sectional view showing the manner of guiding plastic film panels past a pair of welding stations of the type used in the assembly line of FIG. 3.

DESCRIPTION OF THE PREFERRED EMBODIMENTS

The following detailed description is of the best presently contemplated modes of carrying out the invention. This description is not to be taken in a limiting sense, but is made merely for the purpose of illustrating the general principles of the invention since the scope of the invention best is defined by the appended claims.

Referring now to the drawings and particularly to FIGS. 1 and 2 thereof, there is shown a wide, zigzag-folded plastic sheet 10 in accordance with the present invention. The sheet 10 comprises a stack of individual elongated plastic film panels 11a, 11b . . . (herein generally designated panels 11). The panels 11 are joined at alternate edges to form a zigzag structure which permits sheet 10 to be opened to provide a continuous plastic film surface having an overall width equal to the sum of the widths of all the panels 11.

Note in FIGS. 1 and 2 that one marginal edge 12 of a typical inner panel 11b is joined to the corresponding marginal edge 13 of the immediately subjacent panel 11c by means of an edge joining member 15. The other marginal edge 16 of the panel 11b is joined by a like member 15 to the corresponding marginal edge 17 of the panel 11a immediately above in the stack. The remaining panels 11 are similarly joined to form folded sheet 10.

As best evident in FIG. 2, each edge joining member 15 is of generally U-shaped configuration including a pair of leg portions 20, 21 which may be lap welded respectively to the panel edges 12, 13 being joined. Each member 15 has a closed end 22 projecting outwardly from which is a guide bead 23, typically of T-shaped cross-section. As described below in connection with FIGS. 3 and 4, bead 23 is adapted to guide the joining member 15 through the equipment used to fabricate sheet 10.

In the FIG. 1 embodiment, the panels 11 all are of equal width and are not folded in a direction longitudinal of sheet 10. Accordingly, the sides of the stack comprising sheet 10 are defined by the longitudinal edges of the panels 11 and by the laterally projecting guide beads 23. Note that the folded sheet 10 may be quite long, and that the edge joining members 15 are equal in length to the sheet 10.

Automated assembly of the folded sheet 10 may be accomplished using the assembly line and apparatus shown in FIGS. 3 and 4. Referring thereto, the preferably thermoplastic films forming panels 11 are supplied simultaneously from a respective plurality of feed rolls 25. The superposed films are pulled or otherwise transported in the direction indicated by an arrow 26 (FIG. 3) past a series of welding stations 27a, 27b . . . (collectively designated stations 27), spaced along the direction of travel.

At each welding station 27, the edge joining members 15 are suppled via appropriate feed guide rails 28 and inserted between the panels being joined. A buffer strip 29 (FIGS. 2 and 3) of non-thermoplastic-weldable material, e.g., Mylar or fish paper, also is provided between the leg portions 20, 21 of each member 15.

A different pair of edge-to-edge joints is welded at each station 27. Thus at welding station 27a, the panel 11b is joined to the panels 11a and 11c. Similarly, at the welding station 27b shown in detail in FIG. 4, one edge of the panel 11c is joined to the panel 11d by a thermoplastic welding unit 30 and the other edge of the panel 11d is welded to the panel 11e by another thermoplastic welding unit 31. The remaining joints are welded at the successive welding stations 27c, 27d . . , the total number of stations depending on the number of panels 11 in the folded sheet 10.

Note in FIG. 4 that a guide rail 32 having a generally C-shaped cross-sectional end 32a engages the guide bead 23a of the edge joining member 15a used to form the joint between panels 11c and 11d. Thus rail 32 and bead 23a cooperate to guide panels 11c and 11d between the upper and lower heating elements 34, 35 at welding unit 30. These elements 34, 35 respectively weld the corresponding edges of panels 11c, 11d to the leg portions 20a, 21a of member 15a; the buffer strip 29 prevents the leg portions from becoming welded to each other.

Similarly, a guide rail 36 cooperates with the bead 23b to guide the edge joining member 15b (FIG. 4) between upper and lower heating elements 37, 38 of welding unit 31 as the joint between the panels 11d and 11e is being formed.

Note that additional guide rails 39, 40 cooperate with the guide beads 23c, 23d to guide the previously welded joints 44, 45 over the top of, and out of contact with, respective welding units 30, 31. Further, appropriate supports 46 to 50 are provided to support separately the plastic films 11b to 11e during transport past welding units 30, 31.

Note in FIG. 3 that as it is being formed, the sheet 10 is transported to a table 51. Here the sheet 10 may be folded transversely or wound onto a take-up roll (not shown). The sheet 10 then may be cut to the desired length.

In the embodiment described, members 15 preferably are of thermoplastic materials, so as to be thermoplastic welded to panels 11. Alternatively, other types of plastic may be used, and the members 15 either solvent welded or appropriately adhesively attached to panels 11.

Intending to claim all novel, useful and unobvious features shown or described, I make the following claims:

1. A system for forming an elongated joint between the edges of a stacked pair of thermoplastic film sheets, comprising:
    (a) an elongated plastic joining member characterized by having a substantially U-shaped cross-section including legs and a closed end, and a coextensively elongated bead projecting from said closed end in the opposite direction to said leg portions, said bead being cross-sectionally configured for engagement with a guide rail,
    (b) a thermoplastic welding unit for lap welding one edge of each sheet in said stacked pair to the respective legs of said joining member as said sheets and joining member are transported past said unit, and
    (c) a guide rail engaging said bead for directing said joining member into juxtaposition with said sheet edges and into cooperative engagement with said welding unit.

2. The system defined in claim 1, further comprising support means for supporting said sheets during passage past said welding unit.

3. The system defined in claim 1, together with another like welding unit and another like guide rail juxtaposed for simultaneous formation, with another like joining member, of a second joint at the opposite longitudinal edge of one of said sheets.

4. The system defined in claim 1 including additional guide rails cooperating with the beads of like joining members for spaced guidance of other like sheets being edge joined to form a stacked, zigzag-folded sheet structure.

5. Apparatus for forming a wide, zigzag-folded plastic sheet from a plurality of stacked, elongated plastic film panels, comprising:
    means for simultaneously transporting said plurality of stacked panels past several successively spaced welding stations,
    each welding station comprising at least one thermoplastic welding unit situated adjacent a longitudinal edge of said stacked panels and adapted to weld together the edge of one sheet and the corresponding edge of the immediately subjacent sheet in said stack,
    one or more elongated plastic joining members each characterized by having a substantially U-shaped cross-section including legs and a closed end, and a coextensively elongated bead projecting from the closed end in the opposite direction to said leg portions, said bead being cross-sectionally configured for engagement with a guide rail, and
    a guide rail associated with each welding station for engaging the bead of the joining member used to join the sheet edges welded at that welding station, said rail guiding said member and the edges joined thereby around successive welding stations at which other sheet edge pairs are joined.

References Cited

UNITED STATES PATENTS

| | | | |
|---|---|---|---|
| 3,166,458 | 1/1965 | Chinn et al. | 156—502 X |
| 3,346,259 | 10/1967 | Froehlig | 161—100 X |
| 3,008,862 | 11/1961 | Haine et al. | 156—334 X |
| 2,392,734 | 1/1946 | Haberstump | 156—309 X |

ALFRED L. LEAVITT, Primary Examiner

C. WESTON, Assistant Examiner

U.S. Cl. X.R.

156—309, 391, 507, 556; 160—229 R